(12) United States Patent
Tomisawa et al.

(10) Patent No.: US 8,094,184 B2
(45) Date of Patent: Jan. 10, 2012

(54) STEREOSCOPIC TWO-DIMENSIONAL DISPLAY DEVICE

(75) Inventors: Isao Tomisawa, Saitama (JP); Masaru Ishikawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 975 days.

(21) Appl. No.: 11/664,918

(22) PCT Filed: Sep. 28, 2005

(86) PCT No.: PCT/JP2005/017856
§ 371 (c)(1),
(2), (4) Date: Mar. 10, 2008

(87) PCT Pub. No.: WO2006/038509
PCT Pub. Date: Apr. 13, 2006

(65) Prior Publication Data
US 2008/0273083 A1    Nov. 6, 2008

(30) Foreign Application Priority Data
Oct. 7, 2004   (JP) .................................. 2004-295313

(51) Int. Cl.
*H04N 13/04*    (2006.01)
*H04N 13/00*    (2006.01)
*G02B 5/04*    (2006.01)

(52) U.S. Cl. ..................... 348/51; 348/E13.031; 348/42; 348/54; 359/834; 359/837

(58) Field of Classification Search ................... 348/42, 348/51, 54, E13.031; 359/630, 728
See application file for complete search history.

(56) References Cited

U.S. PATENT DOCUMENTS

| | | | | |
|---|---|---|---|---|
| 4,853,769 A * | 8/1989 | Kollin | ............................. | 348/54 |
| 5,526,146 A | 6/1996 | Goodman et al. | | |
| 6,128,144 A * | 10/2000 | Togino | .......................... | 359/728 |
| 6,181,475 B1 * | 1/2001 | Togino et al. | ................. | 359/630 |
| 6,992,718 B1 * | 1/2006 | Takahara | ................. | 348/333.09 |
| 7,139,042 B2 * | 11/2006 | Nam et al. | ............ | 348/E13.031 |
| 7,489,840 B2 * | 2/2009 | Sekiya et al. | ................. | 359/834 |
| 2001/0022562 A1 | 9/2001 | Ishikawa | | |
| 2004/0263698 A1 * | 12/2004 | Nam et al. | ........................ | 349/6 |

FOREIGN PATENT DOCUMENTS

| | | |
|---|---|---|
| EP | 0 631 170 A2 | 6/1994 |
| JP | 07-056171 A | 3/1995 |
| JP | 2001-255493 A | 9/2001 |
| JP | 2002-77341 A | 3/2002 |

(Continued)

*Primary Examiner* — Quang N. Nguyen
(74) *Attorney, Agent, or Firm* — Sughrue Mion, PLLC

(57) ABSTRACT

To facilitate seeing of the image on a peripheral region which may become difficult to see as the screen size increases.
A stereoscopic two-dimensional image display device includes a display unit 1 including an image display plane 1a on which an image is displayed; an image transfer panel 3 arranged apart from the image display plane, for imaging light emitted from the image display plane on an imaging plane 2 in a space, thereby displaying a stereoscopic two-dimensional image; and an optical path changing member (not shown) arranged between the image display plane and the imaging plane, for changing the optical path of the light emitted from the peripheral edge having a predetermined region constituting the image display plane. The optical path of light emitted from the peripheral edge is changed by the optical path changing means so that the light can be reached the eyes of a viewer 100 who sees at a near position.

5 Claims, 16 Drawing Sheets

FOREIGN PATENT DOCUMENTS

| | | |
|---|---|---|
| JP | 2002-328333 A | 11/2002 |
| JP | 2003-98479 A | 4/2003 |
| JP | 2003-156712 A | 5/2003 |
| JP | 2003-238812 A | 10/2003 |
| JP | 2003-337382 A | 11/2003 |

* cited by examiner

STEREOSCOPIC TWO-DIMENSIONAL DISPLAY DEVICE

TECHNICAL FIELD

This invention relates to a stereoscopic two-dimensional image display device for displaying a two-dimensional image pseudo-stereoscopically by using a image transfer panel.

BACKGROUND ART

There is a known stereoscopic two-dimensional image display device in which a micro-lens array which is one of image transfer panels is arranged ahead of and by a prescribed interval apart from the display plane of a two-dimensional image so that the light emitted from the display plane is imaged in a space in front of the micro-lens array and the two-dimensional image is displayed pseudo-stereoscopically in the same space (for example, see Patent Reference 1, Patent Reference 2, Patent Reference 3 and Patent Reference 4).

FIG. 14 is a plan view showing its theoretic configuration.

The stereoscopic two-dimensional image display device includes a display unit 1 provided with an image display plane 1a on which an image is displayed and an image transfer panel 3 arranged apart from the image display plane 1a. The light emitted from the image display plane 1a is imaged on an imaging plane 2 in the space opposite to the display unit 1 with respect to the image transfer panel 3 so that the two-dimensional image visually recognizable as a stereoscopic display by a viewer 100 is displayed pseudo-stereoscopically on the imaging plane (stereoscopic image displaying plane) 2.

Meanwhile, in this kind of stereoscopic two-dimensional image display device, it is known that in terms of the characteristic of the image transfer panel 3 such as the micro-lens, there are certain visual field angles θ visible by a viewer at the respective points on a screen. In FIG. 14, although three representative visual field angles θ at the center and periphery on the screen (imaging plane 2) are shown together, it should be noted that light is actually emitted from all the points on the screen (imaging plane 2).

Therefore, owing to the presence of the visual field angles, as shown in FIG. 15, in order that a viewer 100, can see the entire image, he must see it at a position apart by a certain distance A from the imaging plane 2. Namely, if the viewer 100 is away by a certain distance from the imaging plane 2, the viewer 100 is accommodated within the visual field angles at all the points on the screen so that he can visually recognize the entire image.

Patent Reference 1: JP-A-2001-255493
Patent Reference 2: JP-A-2003-98479
Patent Reference 3: JP-A-2002-77341
Patent Reference 4: JP-A-2003-156712

DISCLOSURE OF THE INVENTION

Problems that the Invention is to Solve

However, as the case may be, it is difficult for a viewer to see at a position away by a certain distance. For example, according to the kind of the image being displayed, he does not want to see at a near position. In this case, as shown in FIG. 16, the position of the viewer 100 is accommodated in the visual field at the center point C on the screen, but is outside the visual field at the peripheral point S. Thus, there is a phenomenon that the image in the vicinity of the center of the screen can be seen but the image on the periphery cannot be seen.

If the screen size is small, since the viewing distance A necessary for right seeding is short, the above phenomenon is not serious. However if the screen size becomes large, correspondingly, the viewing distance necessary for right seeing becomes longer. As a result, the problem that the image on the periphery is invisible is serious.

In view of the above circumstance, an object of this invention is to provide a stereoscopic two-dimensional image display device which can facilitate seeing of the image on a peripheral region which may become difficult to see as the screen size increases, and can effectively employ the entire screen as an image display plane.

Means for Solving the Problems

The stereoscopic two-dimensional image display device defined in claim 1 comprises: a display unit provided with an image display plane on which an image is displayed; an image transfer panel arranged apart from the image display plane, for imaging light emitted from the image display plane on an imaging plane in a space, thereby displaying a stereoscopic two-dimensional image; and an optical path changing member arranged between the image display plane and the imaging plane, for changing the optical path of the light emitted from the peripheral edge having a predetermined region constituting the image display plane.

DESCRIPTION OF REFERENCE NUMERALS AND SIGNS

Figure 1:
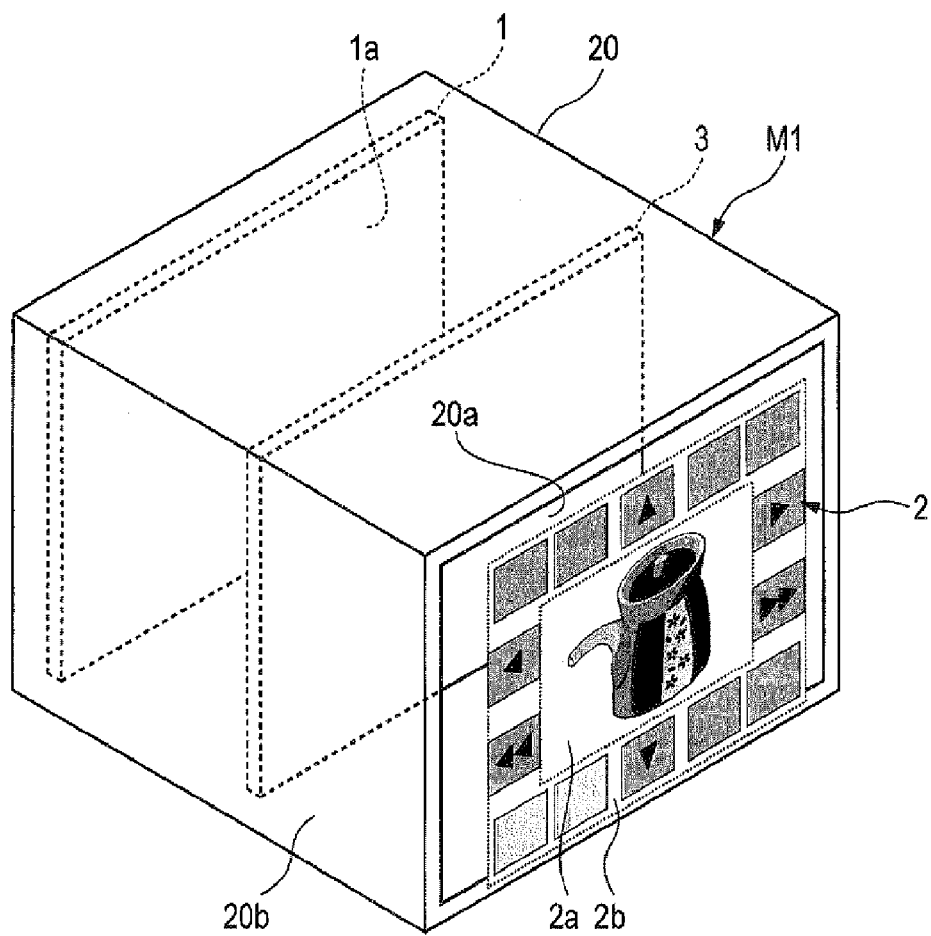
FIG. 1 is a perspective view showing a schematic structure of a stereoscopic two-dimensional image display device according to the first embodiment of this invention.

Reference numerals shown in the drawings are given as follows: Reference numeral 1 shows a display unit; Reference numeral 1a shows an image display plane; Reference numeral 2 shows an imaging plane; Reference numeral 3 shows an image transfer panel; Reference numeral 10 shows an light-diffusing member; Reference numeral 20 shows an optical path changing member; Reference numeral 22 shows a prism; and Reference numeral 23 shows a prism sheet.

BEST MODE FOR CARRYING OUT THE INVENTION

Now referring to the drawings, an explanation will be given of an embodiment of the stereoscopic two-dimensional image display device according to this invention.

Embodiment 1

First, an explanation will be given of the first embodiment of the stereoscopic two-dimensional image display device according to this invention.

Figure 2:
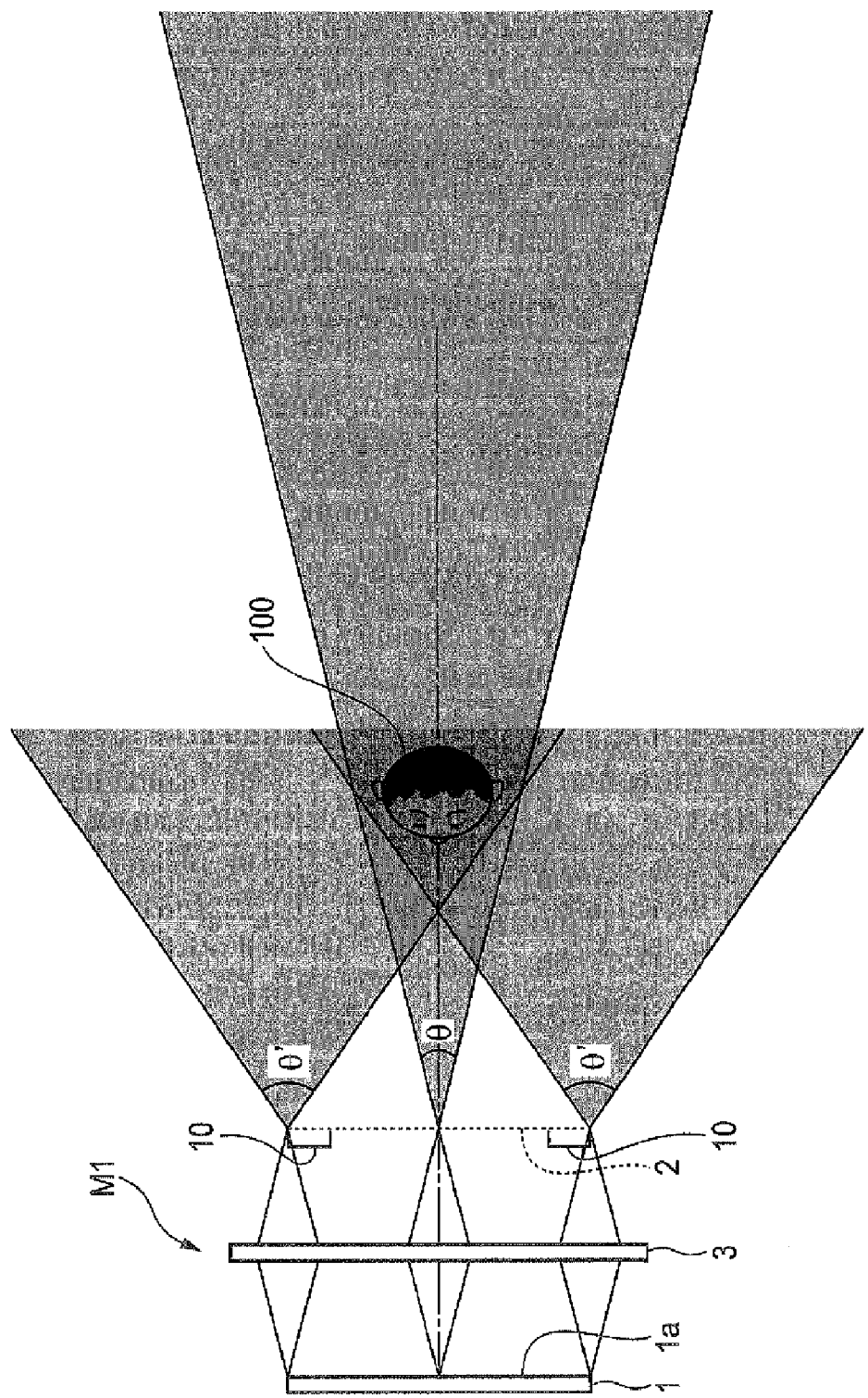
FIG. 2 is a view schematically showing that the image in the peripheral region on a screen can be seen even when a viewer approaches the screen to see in the above device.
Figure 3:
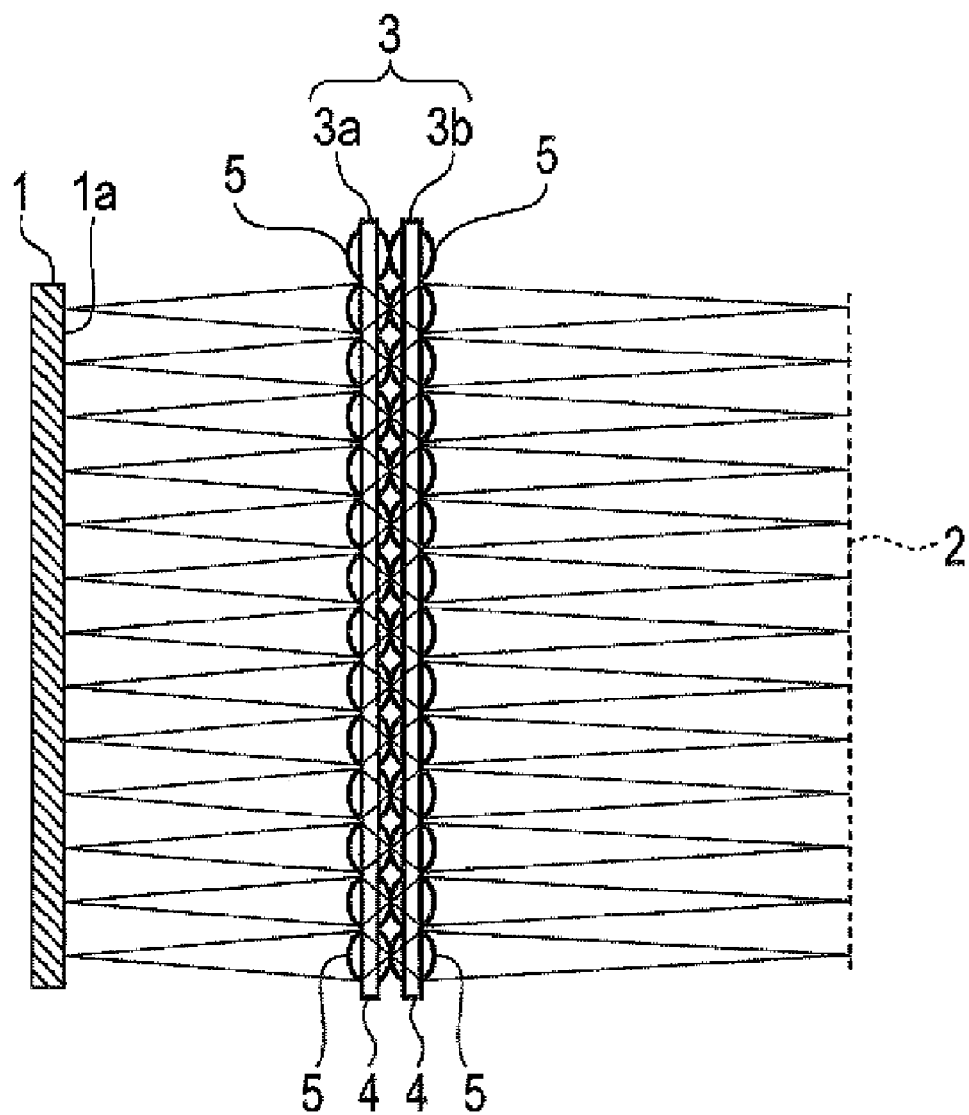
FIG. 3 is a view schematically showing the details of an image transfer panel 3 in the above display device.
Figure 4:
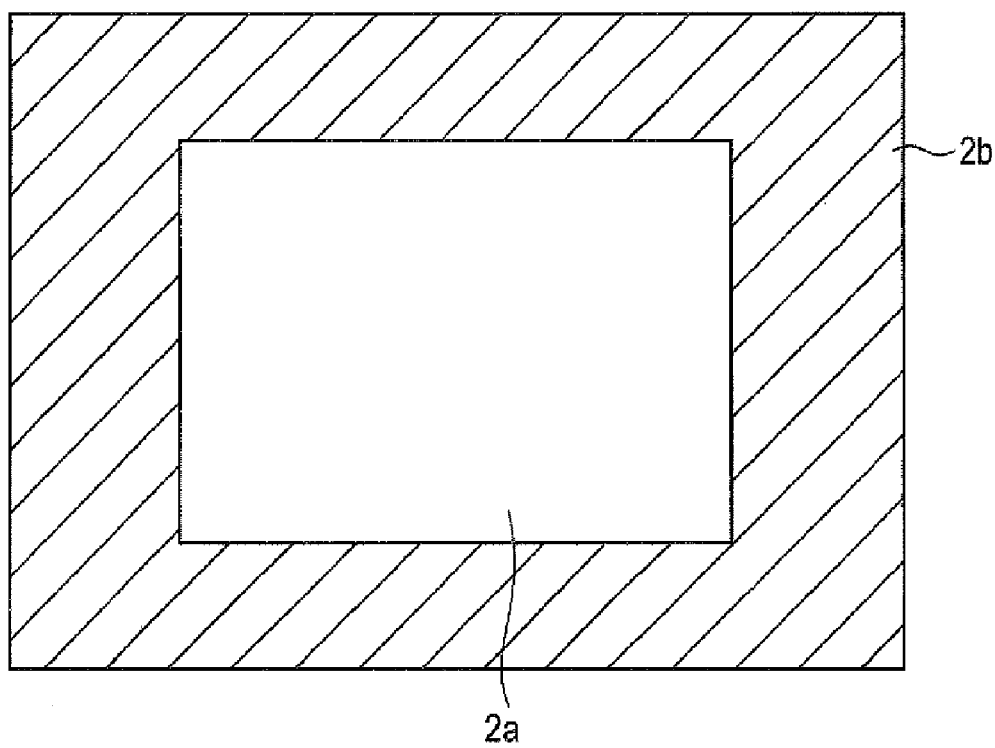
FIG. 4 is a front view for explaining the central region and peripheral region on a screen in the above device.

FIG. 1 is a perspective view showing a schematic structure of a stereoscopic two-dimensional image display device M1 according to this embodiment. FIG. 2 is a view schematically showing that the image on the peripheral region on a screen is visible even when a viewer approaches the screen to see. FIG. 3 is a view schematically showing the details of an image transfer panel 3. FIG. 4 is a front view for explaining the central region and peripheral region on a screen.

A stereoscopic two-dimensional image display device M1 according to this embodiment, as shown in FIGS. 1 and 2, includes a display unit 1 provided with an image display plane 1a on which an image is displayed and an image transfer panel 3 arranged apart from the image display plane 1a. The light emitted from the image display plane 1a is imaged on an imaging plane 2 in the space opposite to the display unit 1 with respect to the image transfer panel 3 so that the two-dimensional image visually recognizable as a stereoscopic display by a viewer 100 is displayed pseudo-stereoscopically on the imaging plane (stereoscopic image displaying plane) 2. In this embodiment, as shown in FIG. 2, on the imaging plane 2 or in the vicinity thereof, a light diffusing member (optical-path changing member) 10 is arranged which diffuses the light emitted from the peripheral edge having a predetermined region constituting the image display plane 1a.

The light diffusing member 10 may be a diffusing plate, a diffusing sheet, a screen, etc. In the illustrated example, the light diffusing member 10 is arranged in the peripheral region exclusive of the central region of the imaging plane 2. Where the light diffusing member 10 shaped in a square plate is employed, by hollowing out the central area thereof in the square shape, the light diffusing member 10 can be arranged in only the peripheral region.

The stereoscopic two-dimensional image display device M1 has a box 20 which houses a display device serving as the display unit 1 and the image transfer panel 3. In the vicinity of an opening 20a of the box 20, the imaging plane 2 is established. Further, as the case may be, as required, a position sensor described later may be provided on the inner side of the wall 20b in the vicinity of the opening plane 20a of the box 20. Further, the stereoscopic two-dimensional image display device M1 includes a control system such as a display driving unit, a sensor driving unit, an image creating unit and a control unit. The display unit 1 is a display device provided on the one inside of the box 20 opposite to the opening plane 20a, which is a liquid crystal display, an EL panel, or a CRT. The display unit 1 has an image display plane 1a consisting of a plurality of pixels on the plane on the opening side of the box 20. The light with a color and intensity corresponding to the image is emitted from each of the pixels.

The image transfer panel 3, for example, as shown in FIG. 3, consists of two micro-lens arrays 3a, 3b. Each micro-lens array 3a, 3b has a plurality of micro-convex lenses 5 adjacently to one another in an array on both sides of a transparent substrate 4 of glass or resin with excellent transparency. The optical axis of each of the micro-convex lenses 5 formed on the one side of each transparent substrate 4 agrees with that of each of the micro-convex lenses 5 formed on the other side of each transparent substrate 4. Incidentally, in this specification, an embodiment in which the lens array plane is formed on any plane of the respective planes (total four planes) of the two lens arrays will be described, but the configuration of the micro-lens array should not be limited to such an embodiment.

When the light corresponding to the image emitted from the image display plane 1a of the display unit 1 is incident on the one plane of the image transfer panel 3, the image transfer panel 3 emits this light from its other plane. The light thus emitted is imaged on the imaging plane 2 opposite to the image display plane 1a and apart therefrom. A light collection imaged by the image transfer panel 3 corresponds to the image displayed on the image display plane 1a. Namely, the image transfer panel 3 displays the image displayed on the image display plane 1a onto the imaging plane (stereoscopic image display plane) 2 which is a stereoscopic two-dimensional plane. Now, the imaging plane is a plane set virtually in the space, but not a substance. The imaging plane is a stereoscopic plane in the space defined according to the operating distance of the image transfer panel 3.

The image imaged on the imaging plane 2 is a two-dimensional image. However, if the image has a sense of depth, or the background image on the display unit 1 is black so that the contrast of an object in the image is emphasized, it looks like as if a three-dimensional (stereoscopic) image would be projected in the space from the viewer 100 on the front. Namely, the two dimensional image displayed on the imaging plane 2 is recognized as the image seen pseudo-stereoscopically (stereoscopic two-dimensional image) by the viewer 100.

In the stereoscopic two-dimensional image display device M1 according to this embodiment, as described above, the light diffusing member 10 is arranged on the peripheral region of the imaging plane 2. Therefore, as seen from FIG. 2, the light emitted from the peripheral region on the screen can be diffused with an angle larger than the original visual field angle θ so that the visual field angle θ' can be substantially increased. As a result, even when the viewer 100 approaches the imaging plane 2 (screen), the light diffused from the peripheral points can be reached the viewer 100. Accordingly, the viewer 100 can see not only the image in the central region but also the image in the peripheral region outside thereof. Further, this can also solve the problem that the image is difficult to see as the screen size increases, thereby facilitating upsizing of the screen. Further, since the image on the peripheral region is made easy to see, the region inclusive of the peripheral region can be employed as an effective display screen with no waste.

Additionally, where diffusion directivity can be given to the light diffusing member 10, the direction of directivity is set nearer to the position where the viewer 100 stands (nearer to the center of the screen). Thus, the light emitted from the imaging plane 2 can be reached the viewer 100 with no waste so that a bright and clear image can be seen.

Further, the image displayed on the imaging plane 2 and recognized by the viewer 100 is formed by the light not passing through the light diffusing member 10 in the central region and the light passed through the light diffusing member 10 in the peripheral region. Therefore, difference in a seeing manner may occur between the central region 2a and the peripheral region 2b as shown in FIG. 4. So, it is desirable to distinguish between the kinds of the image by displaying the main image such as a character or object in the central region 2a and the subsidiary image such as an operating icon or an explanatory drawing in the peripheral region 2b. Thus, a feeling of wrongness by the difference in the seeing manner between the central region 2a and the peripheral region 2b can be eliminated. Particularly, if the image extends over the central region 2a and peripheral region 2b, the possibility of feeling of wrongness may be increased. So, it is desirable to display a discontinuous segment (e.g. blank) of the image at the boundary between the central region 2a and the peripheral region 2b.

Embodiment 2

Next, an explanation will be given of the second embodiment of the stereoscopic two-dimensional image display device according to this invention.

Figure 5:
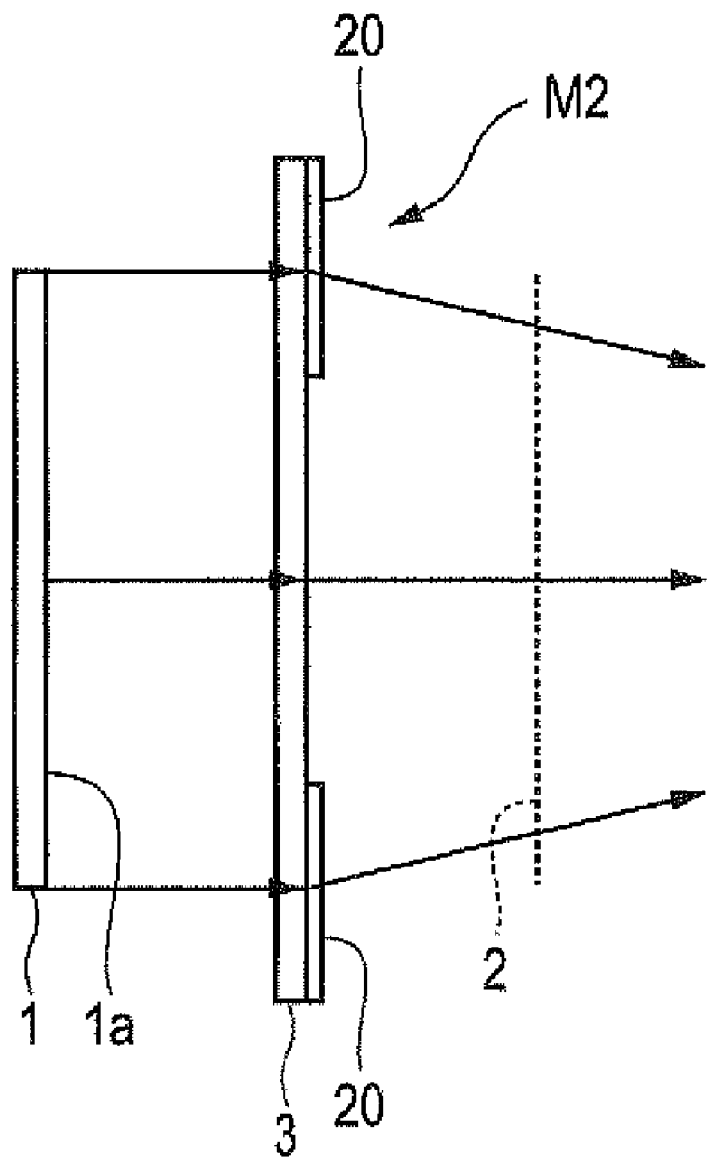
FIG. 5 is a plan view showing a schematic structure of a first example of a stereoscopic two-dimensional image display device according to the second embodiment of this invention.
Figure 6:
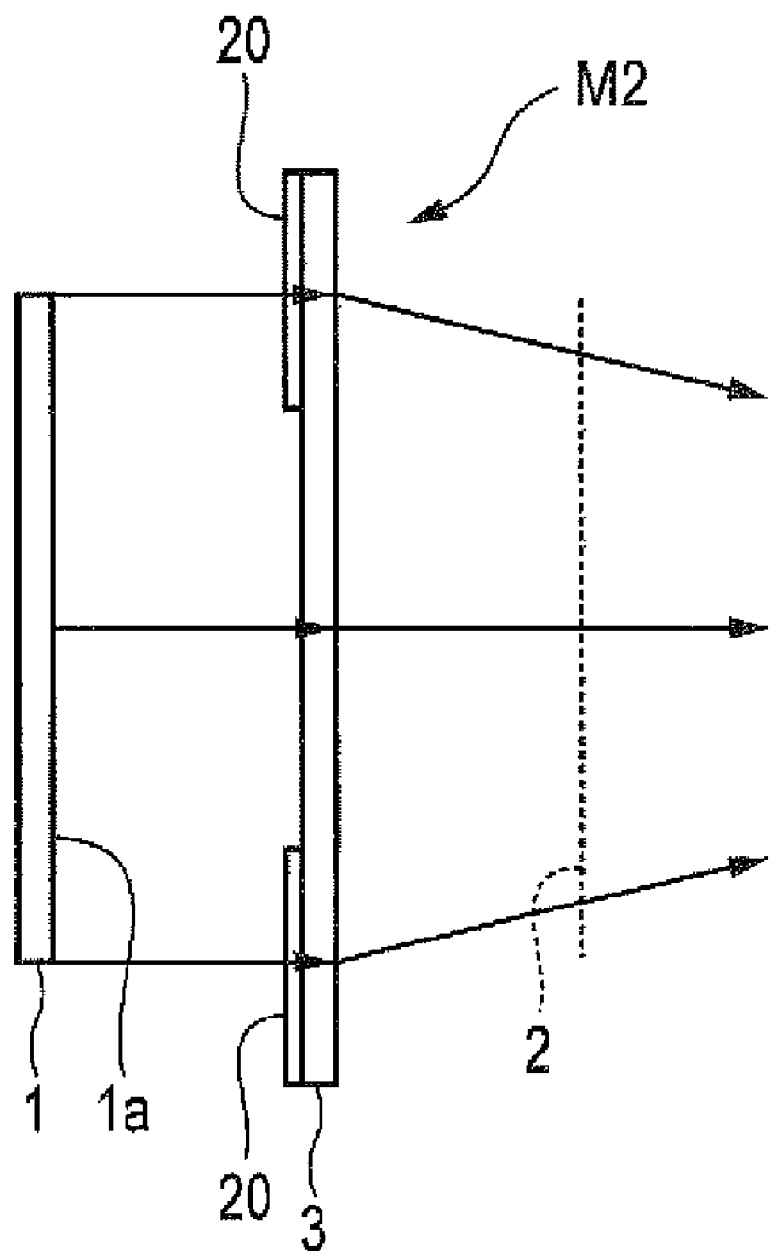
FIG. 6 is a plan view showing a schematic structure of a second example of a stereoscopic two-dimensional image display device according to the second embodiment of this invention.
Figure 7:
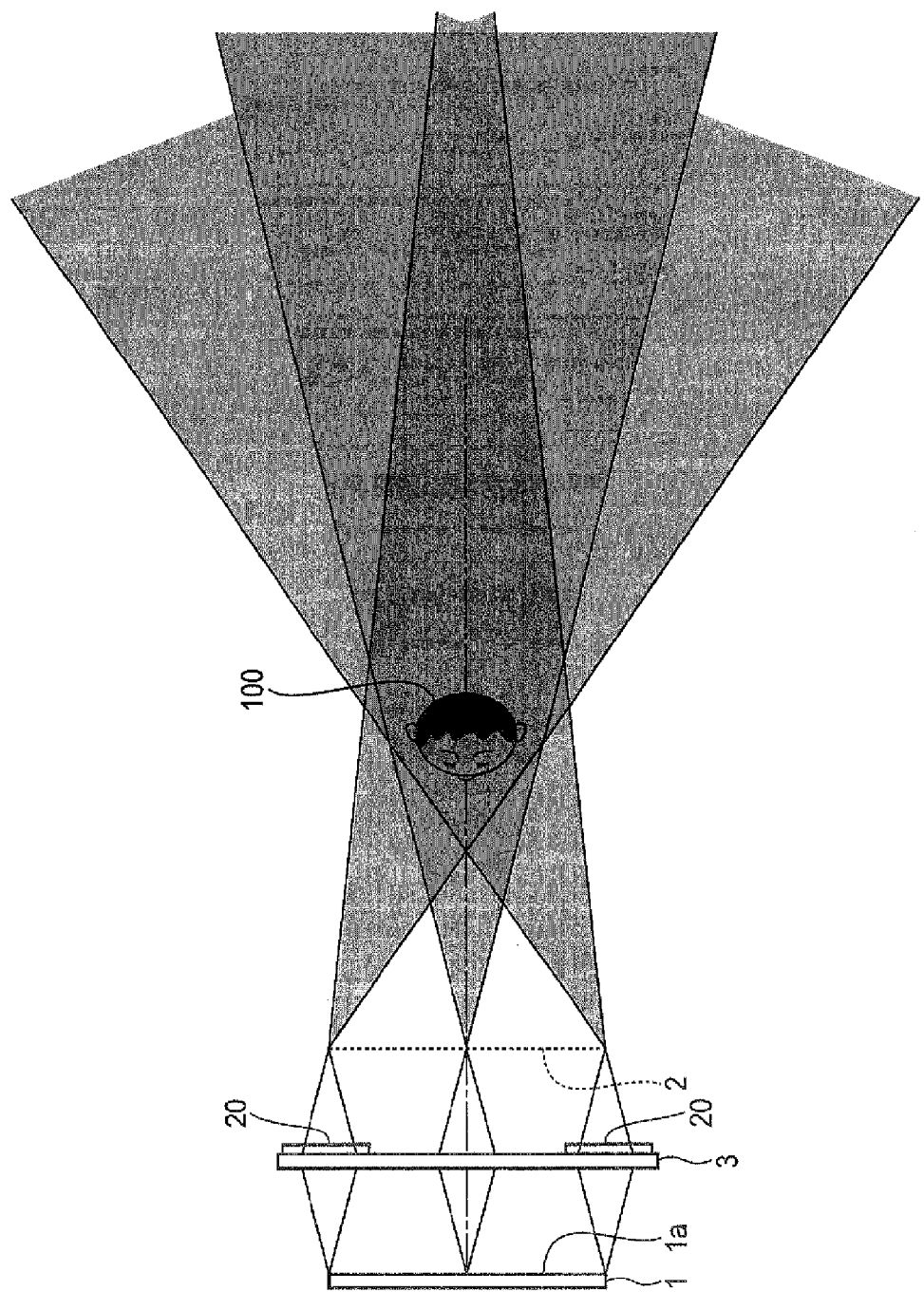
FIG. 7 is a view schematically showing that the image in the peripheral region on a screen can be seen even when a viewer approaches the screen to see in the device according to the second embodiment.

FIGS. 5 and 6 are plan views showing the schematic configuration of a stereoscopic two-dimensional image display device M2 according to this embodiment. FIG. 7 is a view schematically showing that the image on the peripheral region on a screen is visible even when a viewer approaches the screen to see.

The stereoscopic two-dimensional image display device M2 according to this embodiment is characterized, as shown in FIGS. 5 and 6, by the provision of an optical path changing member 20 located between the image display plane 1a and the imaging plane 2; the optical path changing member 20 serving to bend the optical path of the light emitted from the peripheral edge having a predetermined region constituting the image display plane 1a toward the center of the screen. The optical path changing member 20 may be located at any position between the image display plane 1a and the imaging plane 2. In the example illustrated in FIG. 5, it is located in nearly intimate contact with the front surface of the image transfer panel 3. In the example illustrated in FIG. 6, it is located in nearly intimate contact with the rear surface of the image transfer panel 3.

Figure 8:
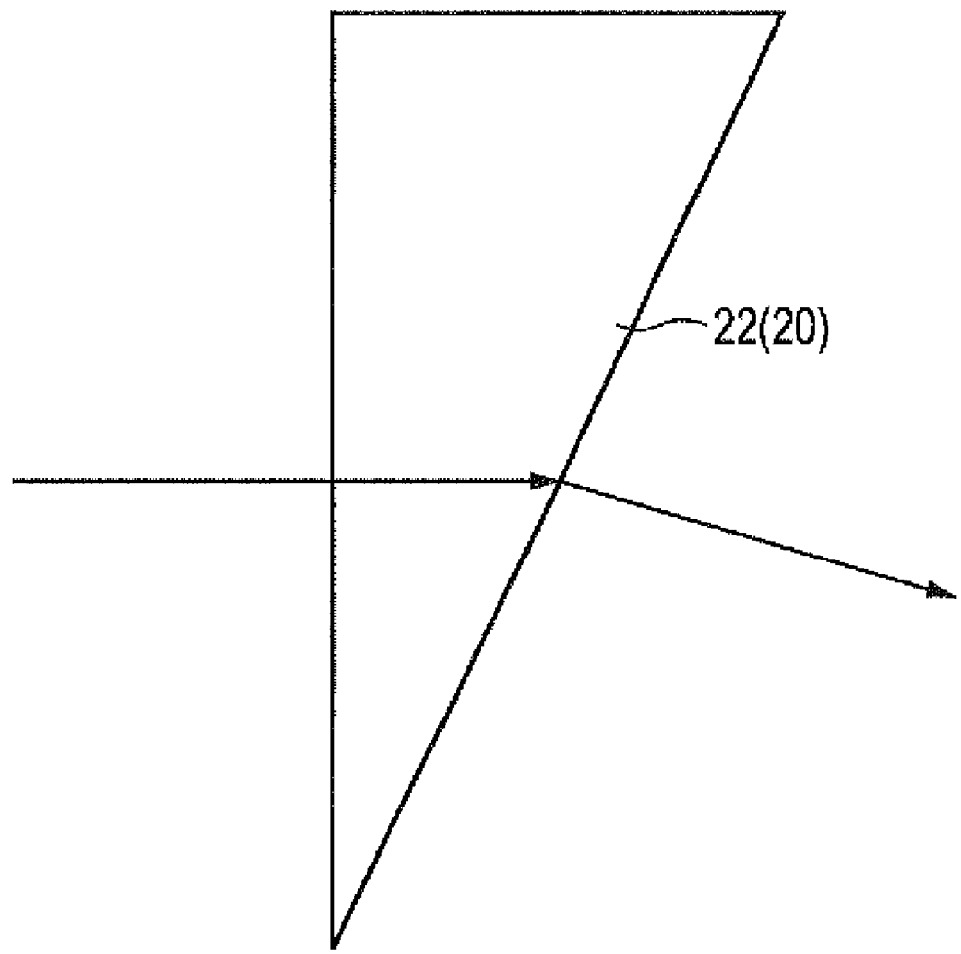
FIG. 8 is a view showing a prism which is an example of an optical path changing member.
Figure 9:
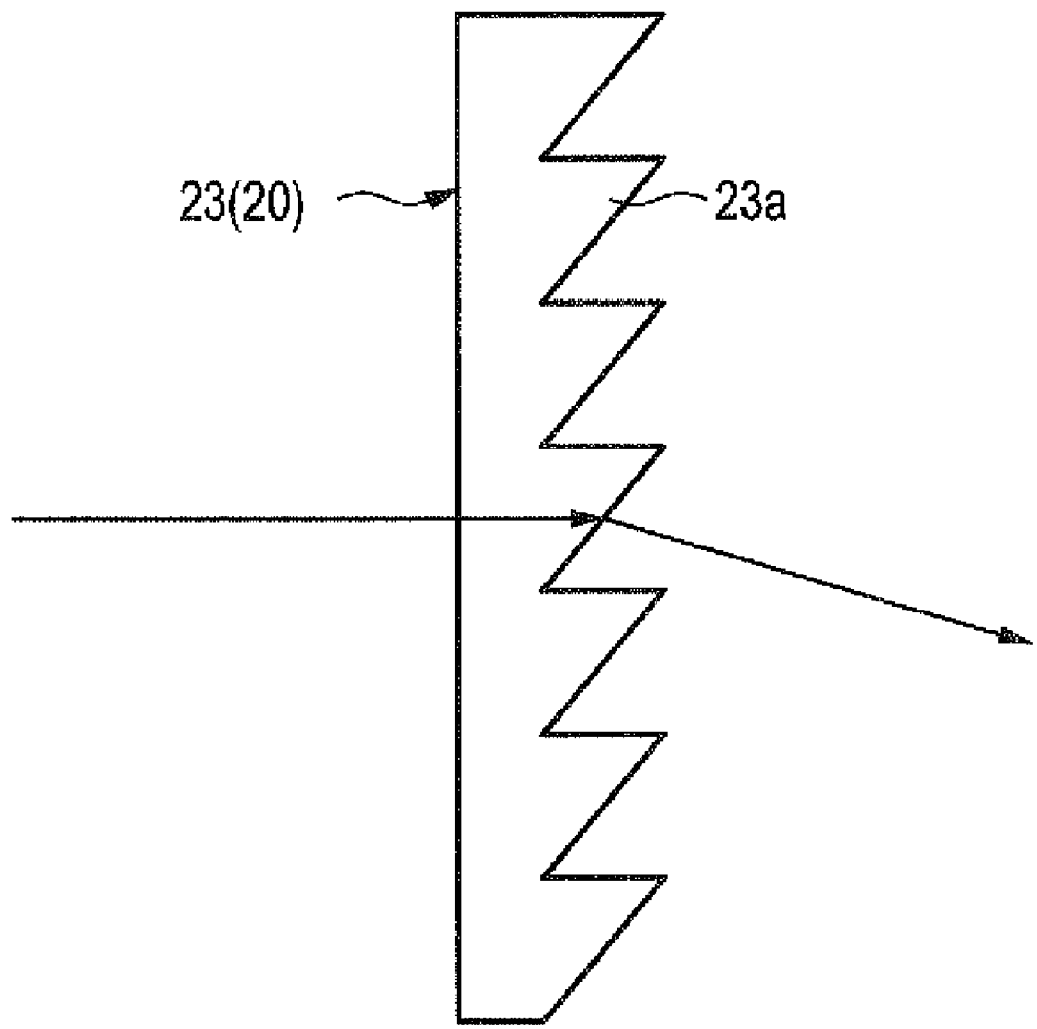
FIG. 9 is a view showing a prism sheet which is an example of the optical path changing member.
Figure 10:
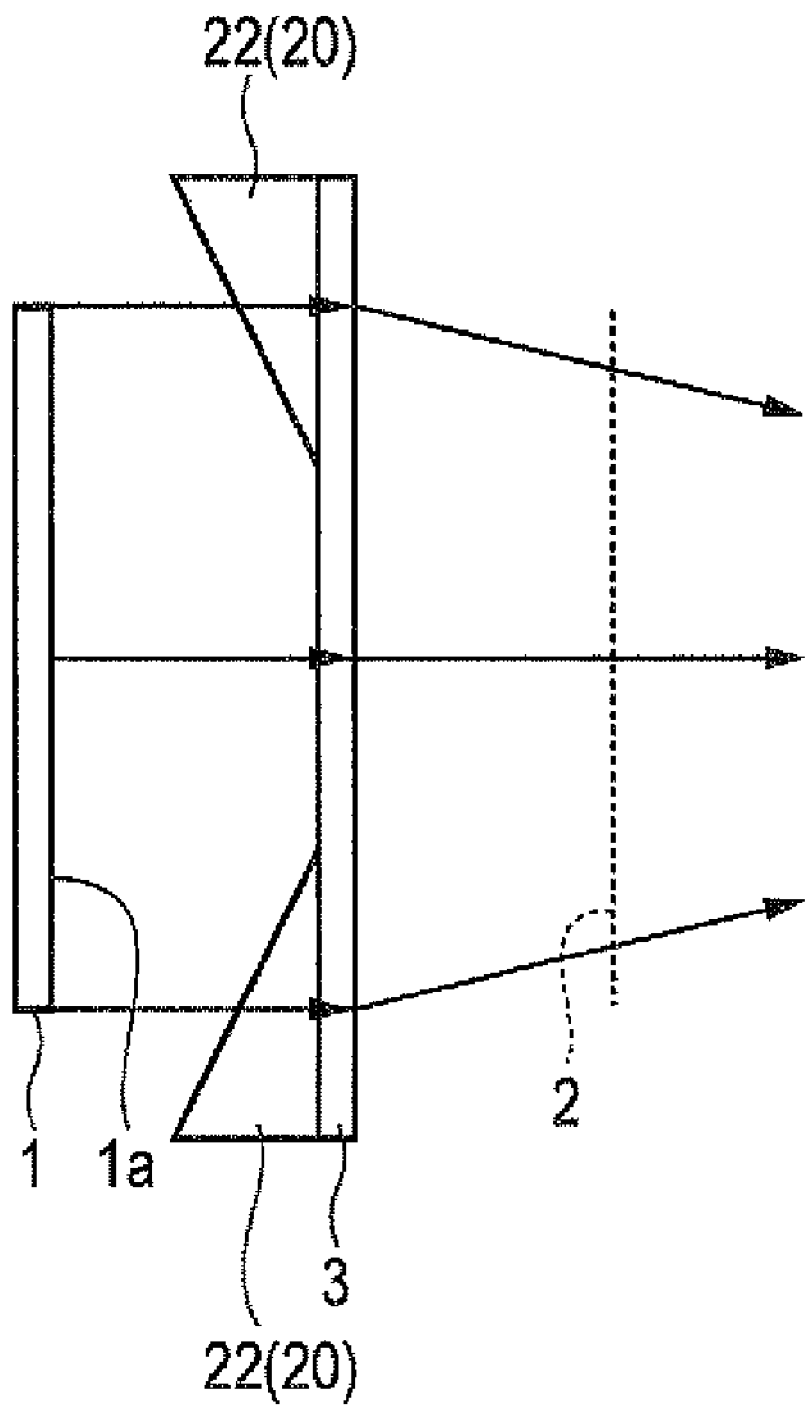
FIG. 10 is a plan view of an example in which the optical path changing means is a prism.
Figure 11A:
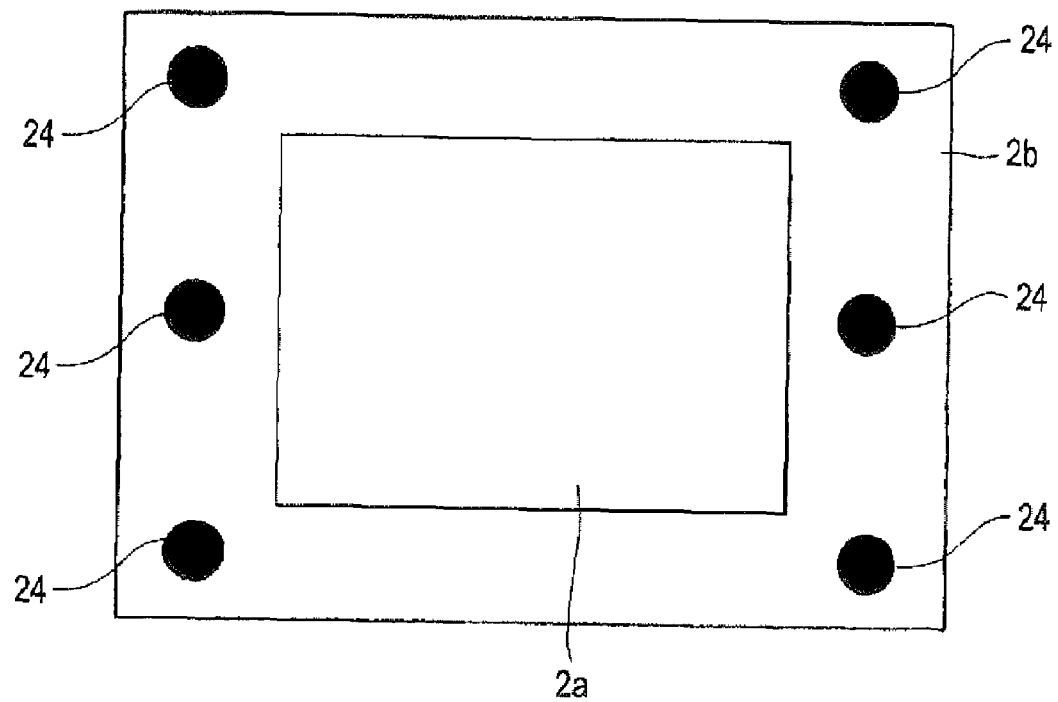
FIG. 11A is a front view showing an example in which an image for guidance is arranged.

The optical path changing member 20 may be a lens not shown (e.g. Fresnel lens), a prism 22 as shown in FIG. 8, or a prism sheet 23 having an arrangement of a plurality of prisms 23a, as shown in FIG. 9. FIG. 10 illustrates an example in which the prism 22 is located in intimate contact with the rear surface of the image transfer panel 3. Where the optical path changing member 20 in a shape of a square sheet is employed, by hollowing out the central area thereof in a square shape, the optical path changing member 20 can be arranged in only the peripheral region.

Where the prism sheet 23 is employed, the position where the viewer can appropriately see the right and left images must be guided. For guidance, it is desirable to display the image for guidance in the peripheral region 2b. FIG. 11A illustrates an example of image display for guidance. In the example illustrated in FIG. 11A, as the image for guidance, three marks 24 of ● are arranged on the right and left sides of the peripheral region 2b, respectively. The shape of the image for guidance should not be limited to ●. The number of the marks 24 and their positions should not be limited to the example illustrated in FIG. 11A.

Figure 11B:
FIG. 11B is a view showing a mark when a viewing position is not proper.

If the viewing position of the mark 24 is not appropriate, as seen from FIG. 11B, ● appears partially chipped or blurred. Where the viewing position is off to either right or left, the left side or right side of ● appears partially chipped. Where the viewing position is off to either or left, the left side or right side of ● appears partially chipped. Where the viewing position is off to back or forth, ● appears blurred. When the viewer moves to the position where ● appears clearly and round with no chip, the viewing position can be established as an appropriate position.

Additionally, the image for guidance may be displayed to be superposed on a normal image. Otherwise, the image for guidance may be previously displayed to urge the viewer to adjust the viewing position and thereafter eliminated to display the normal image.

In the stereoscopic two-dimensional image display device M2 according to this embodiment, as described above, the optical path changing member 20 is located in the peripheral region of the front surface or rear surface of the image transfer panel 3. For this reason, as shown in FIG. 7, the optical path of the light emitted from the peripheral region on the screen can be bent toward the center of the imaging plane 2. As a result, even when the viewer 100 approaches the imaging plane 2 (screen), the light from the peripheral points S can be reached the viewer 100. Accordingly, the viewer 100 can see not only the image in the central region but also the image in the peripheral region outside thereof. Further, this can also solve the problem that the image is difficult to see as the screen size increases, thereby facilitating upsizing of the screen. Further, since the image on the peripheral region is made easy to see, the region inclusive of the peripheral region can be employed as an effective display screen with no waste.

Incidentally, where the stereoscopic two-dimensional image display device is configured as in the above first embodiment or second embodiment, in order that the light on the periphery of the screen can be surely taken in, the image transfer panel 3, light diffusing member 10 and optical path changing member 20 are preferably provided with the next larger size than that of the screen.

Further, in some structures, where the images of the central region 2a and the peripheral region 2b overlap at a certain area, possibility of creating a new visual effect can be anticipated.

Figure 12:
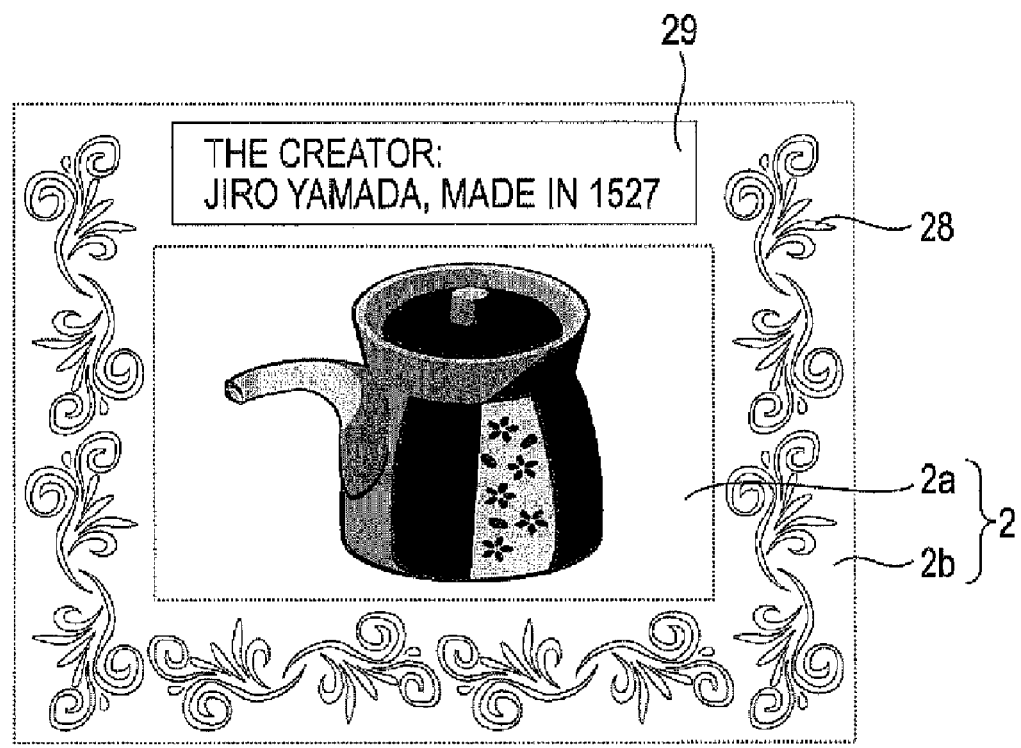
FIG. 12 is a view showing a concrete display example in the embodiments of this invention.
Figure 13:
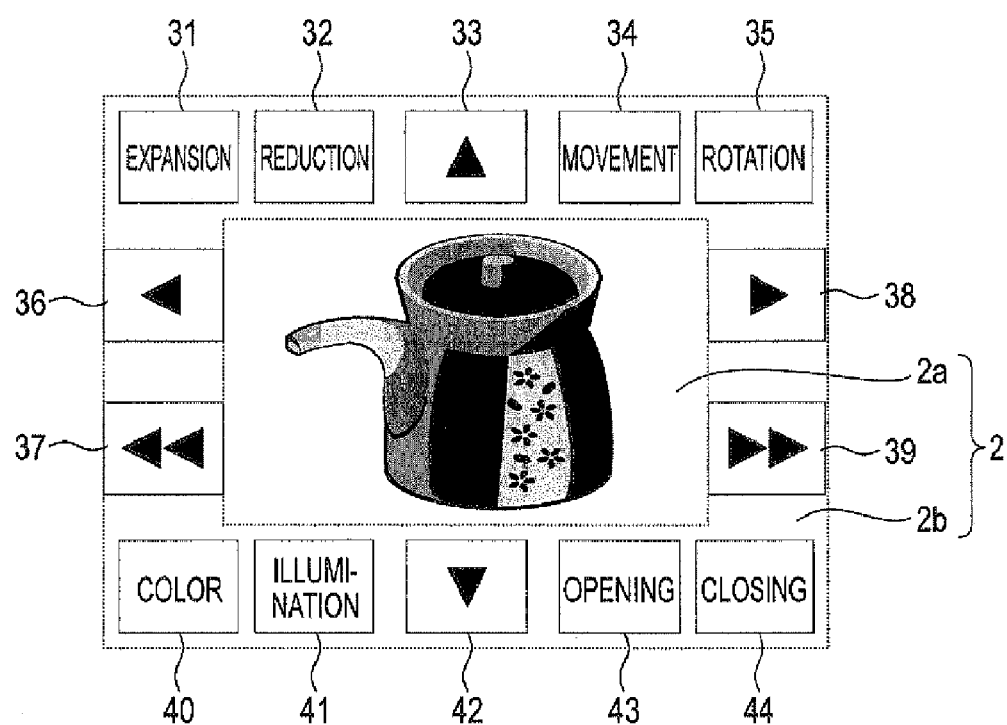
FIG. 13 is a view showing another display example.
Figure 14:
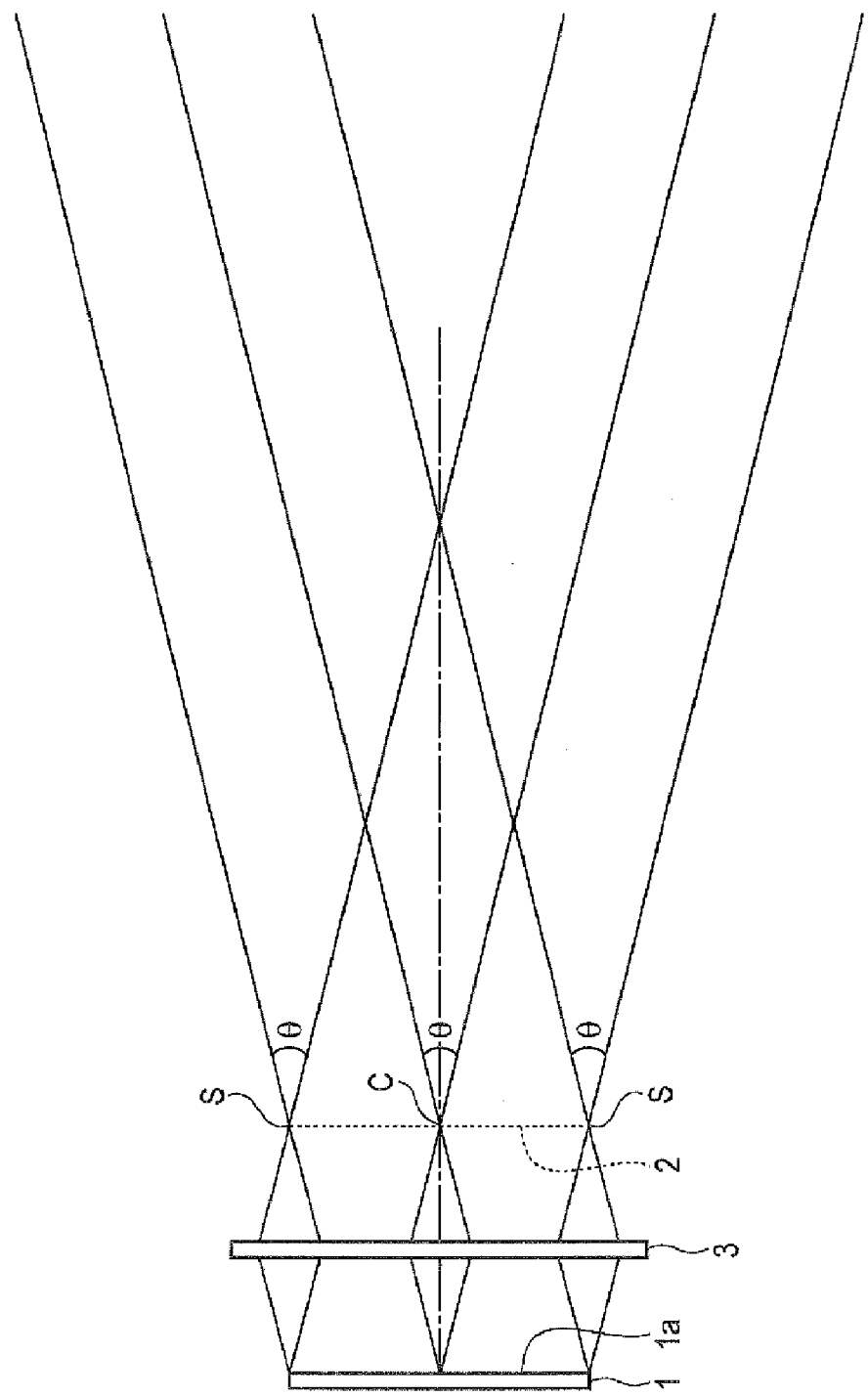
FIG. 14 is a schematic plan view showing the theoretic configuration of a conventional stereoscopic two-dimensional image display device.
Figure 15:
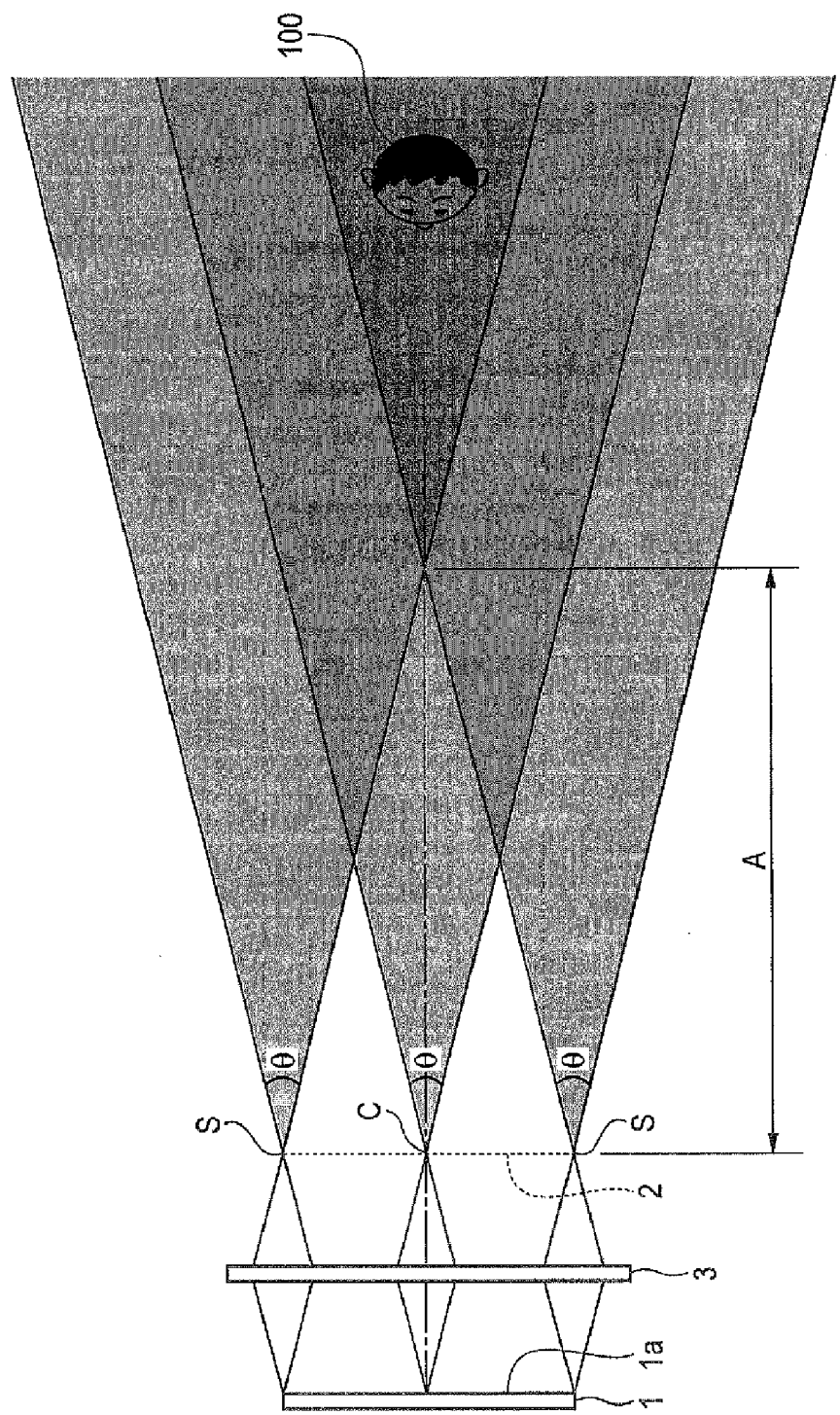
FIG. 15 is a plan view for explaining the relationship between a visual field angle and a proper viewing distance in a conventional stereoscopic two-dimensional image display device.
Figure 16:
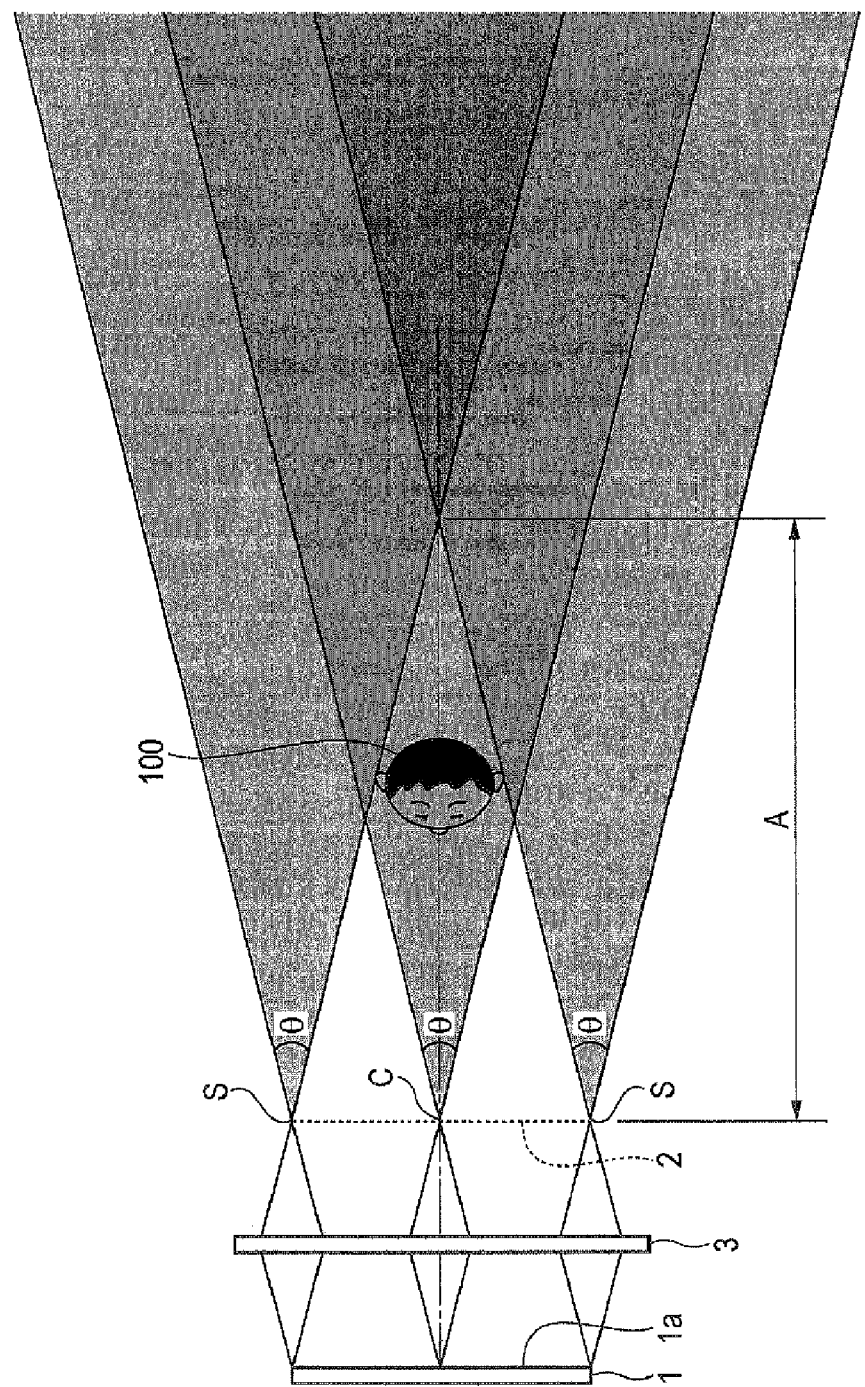
FIG. 16 is a plan view for explaining the phenomenon that the image in a peripheral region cannot be seen because a viewer excessively approaches a screen.

FIGS. 12 and 13 illustrate concrete examples displayed on the imaging plane 2 in the stereoscopic two-dimensional image display device M1, M2 according to each of the first and second embodiments. In the example illustrated in FIG. 12, in the central region 2a of the imaging plane 2, the main image (e.g. character image, object image) is displayed whereas in the peripheral region 2b thereof, the subsidiary image such as a frame decoration 28 or an explanation 29 is displayed. In the example illustrated in FIG. 13, in the central region 2a, the main image is displayed whereas in the peripheral region 2b, icon images of various operating buttons are displayed.

Since the peripheral region 2b in the example of FIG. 13 is constituted as a user interface region, when a user adds an a specific operating input at the position of the icon image corresponding to each of various instructions, he can give an instruction such as an image change. The user interface region in this case is a region sensed by a position detecting sensor described later. When an object such as a user's finger is detected at the position corresponding to the icon image in this region, for example, the control unit changes the image displayed in the central region 2*a* according to an operation represented by the icon image displayed at the detected position.

The position detecting sensor serves to detect the position of the object (to be detected) such as the user's finger inserted in a predetermined region thereby to produce a signal corresponding to the detected position. The position detecting sensor is located, for example, on the inner peripheral side of the opening of the box. The position detecting sensor may be a two-dimensional position detecting sensor or a three-dimensional position detecting sensor according to uses.

Where the two-dimensional detecting sensor is adopted as the position detecting sensor, it is preferably constructed so that when the object such as a human's finger or a stick crosses a detecting plane of the imaging plane 2 or a plane in the vicinity thereof, the detected signal corresponding to the position is produced. Further, the control unit preferably changes, for example the main image displayed in the central region 2*a* according to the signal produced from the position detecting sensor.

The case in the illustrated example will be explained in detail. In the central region 2*a* of the imaging plane 2, the image of a pot is displayed. In the peripheral region 2*b*, a plurality of icon images 31 to 44 are displayed as an operating menu so as to surround the pot image. For example, as a certain ion image 31, the character of "expansion" encircled by a rectangle is shown like a button. When the user tries to depress the icon image 31 so that the user's finger is inserted in the region corresponding to the icon image 31, the position detecting sensor detects the finger insertion. According to the detected signal produced from the position detecting sensor, the control unit changes the pot image displayed in the central region 2*a* into its expanded image so as to correspond to the character of "expansion" displayed on the icon image 31.

Likewise, when the user's finger is inserted into the region corresponding to each of the other ion images 32 to 44, the control unit changes the pot image so as to correspond to the meaning of the image of the character or symbol ("reduction", "movement", "rotation", "color", "illumination", "opening", "closing", "▲", etc.) displayed on each of the icon images 32 to 44.

Now, the icon image represented by the character has a button function for mode selection. For example, "reduction" means the reduction of the size of the pot; and "movement" means if or not the mode of moving the displaying position of the pot should be adopted. The "rotation" means if or not the mode of rotating the pot image should be adopted. The "color" means changing the color scheme of the pot. The "illumination" means if or not the image of the pot as illuminated with light should be displayed, or changing the angle and direction of light illumination. The "opening" and "closing" means the operation of opening and closing the cap of the pot. The group of icons using symbol "▲" correspond to the operations of actually moving or rotating the pot by manipulating these ions after the group of ions for mode selection such as the movement or rotation have been manipulated.

As understood from the description hitherto made, in accordance with the embodiments of this invention, between the image display plane 1*a* and the imaging plane 2, the optical path changing member 10 is arranged for changing the optical path of the light emitted from the peripheral edge having a predetermined region constituting the image display plane 1*a*. For this reason, the light emitted from the peripheral region of the screen which was difficult to see when the viewer excessively approached the screen can be reached the viewer by the action of the optical path changing member 10. Thus, even when the viewer approaches the screen, the image in the peripheral region can be seen. Further, this can also solve the problem that the image is difficult to see as the screen size increases, thereby facilitating upsizing of the screen. Further, since the image on the peripheral region is made easy to see, the region inclusive of the peripheral region can be employed as an effective display screen with no waste.

Further, in accordance with the embodiment of this invention, since the optical path changing member 10 diffuses the light emitted from the peripheral edge of the image display plane 1*a*, the visual field angle in the peripheral region of the screen can be substantially increased. As a result, even when the viewer approaches the imaging plane 2, the light diffused from the peripheral region can be reached the viewer so that the image in the peripheral region can be seen. The optical path changing member 10 in this case may be the light diffusing member such as a diffusing plate, a diffusing sheet, a screen, etc.

Further, in the accordance with the embodiment of this invention, the optical path changing member 20 may be a member which bends the light emitted from the peripheral region on the screen toward the center of the image display plane. In this case, even when the viewer approaches the imaging plane 2, the light emitted from the peripheral region can be reached the viewer so that the image in the peripheral region can be seen. The optical path changing member in this case may be a lens (Fresnel lens), a prism, or a prism sheet having an arrangement of a plurality of prisms.

Further, the optical path changing member 20, as long as it is located between the image display plane 1*a* and the imaging plane 2, may be arranged in the vicinity of the imaging plane 2, or in the vicinity of the front surface or rear surface of the image transfer panel 3.

This application is based on Japanese Patent Application (Patent Application No. 2004-295313) filed on Oct. 7, 2004, and the contents thereof are incorporated herein by reference.

The invention claimed is:

1. A stereoscopic two-dimensional image display device comprising:
    a display unit including an image display plane on which an image is displayed;
    an image transfer panel arranged apart from the image display plane, for imaging light emitted from the image display plane on an imaging plane in a space, thereby displaying a stereoscopic two-dimensional image; and
    an optical path changing member arranged between the image display plane and the imaging plane, for changing the optical path of the light emitted from the peripheral edge having a predetermined region constituting the image display plane, wherein the stereoscopic two dimensional image which is individually visible is displayed on the imaging plane of the peripheral edge formed through the optical path changing member and the imaging plane except the peripheral edge, and a mark serving as an image for guidance is displayed in the peripheral edge in at least its right and left position with respect to a central region;
    wherein the optical path changing member is a prism sheet having an arrangement of a plurality of prisms located in the vicinity of the front surface or rear surface of the image transfer panel and bends the light emitted from the peripheral edge toward the center of the image plane.

2. The stereoscopic two-dimensional image display device according to claim 1, wherein the optical path changing member is a lens.

3. The stereoscopic tow-dimensional image display device according to claim 1, wherein the optical path member is a prism.

4. The stereoscopic tow-dimensional image display device according to claim 1, wherein the image transfer panel is a micro-lens array.

5. The stereoscopic tow-dimensional image display device according to claim 1, wherein the mark is eliminated after a viewing position is adjusted.

* * * * *